United States Patent
Davies et al.

(10) Patent No.: US 11,258,843 B2
(45) Date of Patent: *Feb. 22, 2022

(54) TRANSMITTING HIGH LATENCY DIGITAL COMPONENTS IN A LOW LATENCY ENVIRONMENT

(71) Applicant: Google LLC, Mountain View, CA (US)

(72) Inventors: Scott Tadashi Davies, Santa Monica, CA (US); Justin Lewis, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/828,646

(22) Filed: Mar. 24, 2020

(65) Prior Publication Data

US 2020/0228591 A1 Jul. 16, 2020

Related U.S. Application Data

(63) Continuation of application No. 15/696,817, filed on Sep. 6, 2017, now Pat. No. 10,645,146.
(Continued)

(51) Int. Cl.
*H04L 29/08* (2006.01)
*H04N 1/00* (2006.01)
(Continued)

(52) U.S. Cl.
CPC ............ *H04L 67/06* (2013.01); *G06F 16/248* (2019.01); *G06F 16/26* (2019.01); *G06F 16/93* (2019.01);
(Continued)

(58) Field of Classification Search
CPC ... G06F 16/248; G06F 16/93; G06Q 30/0277; H04L 67/06; H04L 67/20; H04L 67/322; H04L 67/42
See application file for complete search history.

(56) References Cited

U.S. PATENT DOCUMENTS

| 5,732,230 A | 3/1998 | Cullen |
| 7,062,487 B1 | 6/2006 | Nagaishi et al. |
| (Continued) | | |

FOREIGN PATENT DOCUMENTS

| CN | 101765840 | 6/2010 |
| CN | 102132578 | 7/2011 |
| (Continued) | | |

OTHER PUBLICATIONS

IN Office Action in Indian Application No. 201927023371, dated Jan. 21, 2021, 7 pages (with English translation).

(Continued)

Primary Examiner — David R Lazaro
(74) Attorney, Agent, or Firm — Fish & Richardson P.C.

(57) ABSTRACT

Methods, systems, and apparatus, including computer programs encoded on a computer storage medium, for during a first time period, identifying first digital components for presentation when an electronic document is presented at the client device; generating, using priority indicators assigned to each first digital component, a digital component priority queue that specifies an order of presentation of the first digital components; transmitting, to the client device, the electronic document, the first digital components, and the digital component priority queue; during a second time period that occurs after the first time period, identifying a second digital component for presentation when the electronic document is presented at the client device; and updating the digital component priority queue at the client device, including causing the second digital component to be inserted into the digital component priority queue based on a priority indicator assigned to the second digital component.

20 Claims, 9 Drawing Sheets

Related U.S. Application Data

(60) Provisional application No. 62/518,871, filed on Jun. 13, 2017.

(51) Int. Cl.

| | | |
|---|---|---|
| *G06F 16/26* | (2019.01) | |
| *G06F 16/93* | (2019.01) | |
| *G06F 16/248* | (2019.01) | |
| *G06Q 30/02* | (2012.01) | |
| *H04L 29/06* | (2006.01) | |

(52) U.S. Cl.
CPC ....... *G06Q 30/0277* (2013.01); *H04L 67/322* (2013.01); *H04N 1/00108* (2013.01); *H04N 1/00244* (2013.01); *H04L 67/20* (2013.01); *H04L 67/42* (2013.01); *H04N 2201/0044* (2013.01)

(56) References Cited

U.S. PATENT DOCUMENTS

| | | | |
|---|---|---|---|
| 9,201,573 | B1 | 12/2015 | Miles |
| 9,204,205 | B1 | 12/2015 | Pasula |
| 9,432,733 | B2 | 8/2016 | Eldering et al. |
| 10,645,146 | B2 * | 5/2020 | Davies .................. G06F 16/248 |
| 2002/0002602 | A1 | 1/2002 | Vange |
| 2002/0083132 | A1 | 6/2002 | Holland |
| 2002/0120666 | A1 | 8/2002 | Landsman |
| 2003/0005002 | A1 | 1/2003 | Chen |
| 2005/0038900 | A1 | 2/2005 | Krassner |
| 2006/0041638 | A1 | 2/2006 | Whittaker et al. |
| 2008/0071762 | A1 | 3/2008 | Turner |
| 2008/0071763 | A1 | 3/2008 | Ferrenq et al. |
| 2010/0228744 | A1 | 9/2010 | Craswell et al. |
| 2011/0083082 | A1 | 4/2011 | Gottwald |
| 2011/0231250 | A1 | 9/2011 | Elbaum et al. |
| 2012/0254300 | A1 | 10/2012 | Rai |
| 2013/0097029 | A1 | 4/2013 | Mhatre et al. |
| 2013/0238977 | A1 | 9/2013 | Abrahami |
| 2014/0052536 | A1 | 2/2014 | McAndrew et al. |
| 2014/0250367 | A1 | 9/2014 | Ivory |
| 2014/0279026 | A1 | 9/2014 | Nath et al. |
| 2014/0304332 | A1 | 10/2014 | Kimpe |
| 2016/0260123 | A1 | 9/2016 | Mishra et al. |
| 2016/0321690 | A1 | 11/2016 | Ma |
| 2018/0359308 | A1 * | 12/2018 | Davies .................. G06F 16/248 |
| 2020/0228591 | A1 * | 7/2020 | Davies .................. G06F 16/93 |

FOREIGN PATENT DOCUMENTS

| | | |
|---|---|---|
| CN | 103221951 | 7/2013 |
| WO | WO 2008/033482 | 3/2008 |

OTHER PUBLICATIONS

JP Office Action in Japanese Application No. 2019-556213, dated Nov. 16, 2020, 5 pages (with English translation).

JP Notice of Allowance in Japanese Application No. 2019-556213, dated Jul. 19, 2021, 5 pages (with English translation).

CN Office Action in Chinese Appln. No. 201780082951, dated May 31, 2021, 12 pages (with English translation).

EP Office Action in European Application No. 17771931.7, dated May 20, 2020, 9 pages.

International Search Report and Written Opinion issued in International Application No. PCT/US2017/050251, dated Dec. 6, 2017, 17 pages.

PCT Written Opinion of the International Preliminary Examining Authority in the International Appln. PCT/US2017/050251, dated May 13, 2019, 9 pages.

* cited by examiner

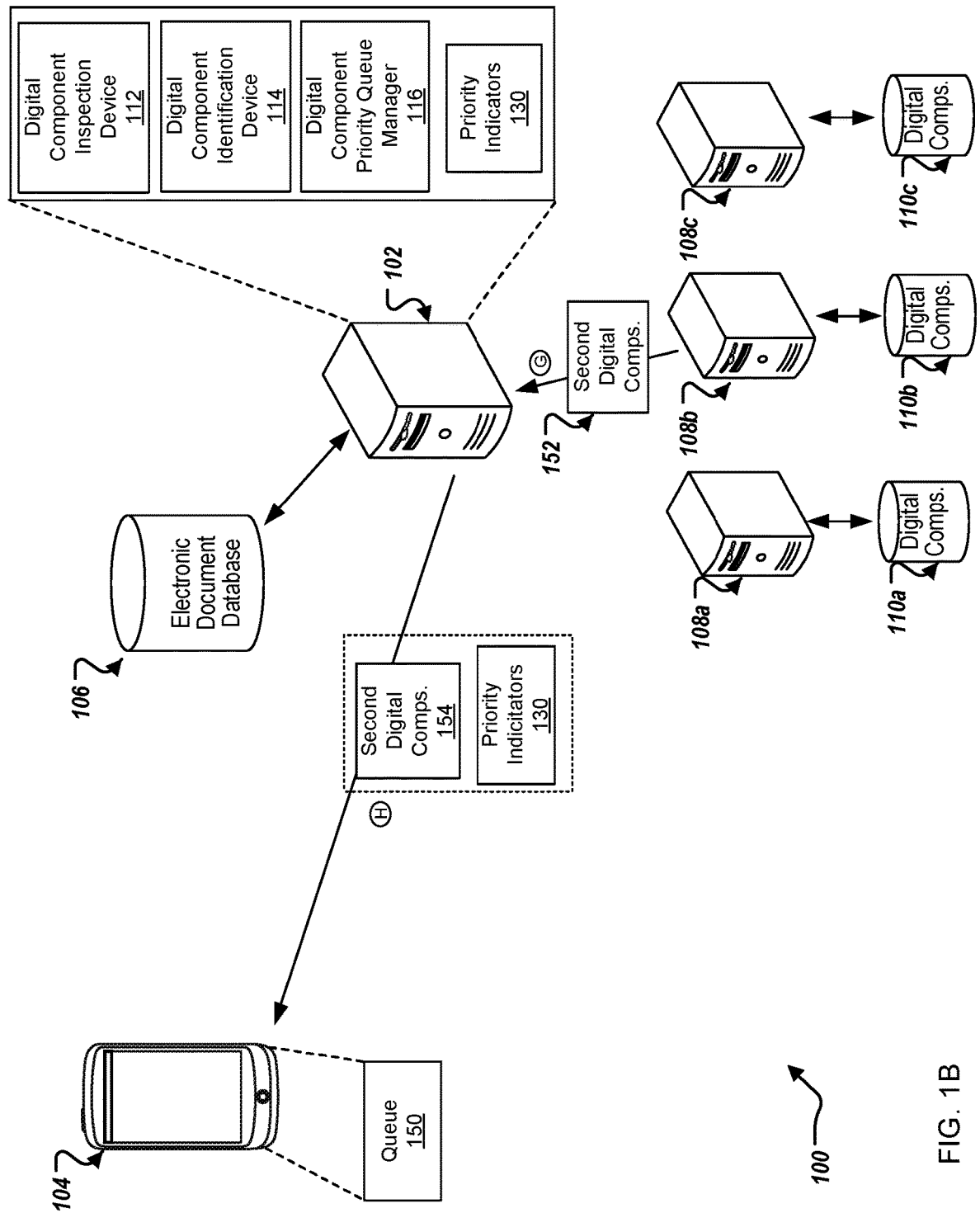

TRANSMITTING HIGH LATENCY DIGITAL COMPONENTS IN A LOW LATENCY ENVIRONMENT

CROSS-REFERENCE TO RELATED APPLICATIONS

This application is a continuation application of, and claims priority to, U.S. patent application Ser. No. 15/696,817, titled "TRANSMITTING HIGH LATENCY DIGITAL COMPONENTS IN A LOW LATENCY ENVIRONMENT," filed on Sep. 6, 2017, which application claims the benefit under 35 U.S.C. § 119(e) of U.S. Provisional Patent Application No. 62/518,871, entitled "Transmitting High Latency Digital Components In A Low Latency Environment," filed Jun. 13, 2017, which are incorporated herein by reference in their entirety.

BACKGROUND

This document relates to techniques for transmitting high latency digital components in a low latency environment. For example, a large amount of digital components are distributed to portable computing devices, such as mobile phones, tablet devices, and other portable computing devices. Often, the digital components distributed to these portable devices are transmitted over wireless connections, including mobile phone networks (e.g., cellular communications networks). In some situations, the digital components that are distributed must be transmitted within a specified latency constraint, such that digital components that are not provided to the client device within the latency constraint are not available for use by the client device.

SUMMARY

Innovative aspects of the subject matter described in this specification may be embodied in a method that includes the actions of identifying, by one or more servers, an electronic document for delivery to a client device; during a first time period, identifying, by the one or more servers, a set of first digital components for presentation when one or more of the electronic documents from the electronic document are presented at the client device; generating, by the one or more servers and using priority indicators assigned to each first digital component in the set of first digital components, a digital component priority queue that specifies an order of presentation of the first digital components from the set of first digital components that were identified during the first time period; transmitting, by the one or more servers and to the client device, the electronic document, the set of first digital components, and the digital component priority queue; during a second time period that occurs after the first time period, identifying, by the one or more servers, a second digital component for presentation when the one or more of the electronic documents are presented at the client device; and updating, by the one or more servers, the digital component priority queue at the client device, including causing the second digital component to be inserted into the digital component priority queue based on a priority indicator assigned to the second digital component.

Other embodiments of these aspects include corresponding systems, apparatus, and computer programs, configured to perform the actions of the methods, encoded on computer storage devices.

These and other embodiments may each optionally include one or more of the following features. For instance, updating further includes updating, by the one or more servers, the digital component priority queue at the client device based on the priority indicator assigned to the second digital component and the priority indicators assigned to each of the first digital components. Updating the digital component priority queue includes causing the second digital component to be inserted into the first digital component priority queue based on the priority indicator assigned to the second digital component rather than a time when the second digital component is added to the digital component priority queue. The set of first digital components are proposed by one or more third party systems and the second digital component is proposed by an additional third party system. The priority indicator of each first digital component is assigned by the respective third party system, and the priority indicator of the second digital component is assigned by the additional third party system. The electronic document comprises a set of electronic documents. Generating, by the one or more servers, a composite document that i) is hosted by a different domain than at least some electronic documents in the set of electronic documents and ii) includes the set of electronic documents, wherein transmitting further includes transmitting, by the one or more servers and to the client device, the composite page, the set of first digital components, and the digital component priority queue.

Further features include, for instance, during a third time period that occurs after the second time period, identifying by the one or more servers, a third digital component that, during the third time period, has been proposed by a further third party system for presentation when the one or more of the electronic documents are presented at the client device; and updating, by the one or more servers, the digital component priority queue at the client device, including causing the third digital component to be inserted into the digital component priority queue based on the priority indicator assigned to the third digital component. Updating further includes updating, by the one or more servers, the digital component priority queue at the client device based on the priority indicator assigned to the third digital component, the priority indicator assigned to the second digital component, and the priority indicators assigned to each of the first digital components. Receiving, by the one or more servers and from the client device, a search query, wherein identifying further includes identifying, by the one or more servers, the set of electronic documents using the search query. The set of first digital components comprise digital components that are smaller than the second digital component.

Innovative aspects of the subject matter described in this specification may be embodied in a system that includes an electronic document inspection device that identifies a set of electronic documents for delivery to a client device; a digital component identification device that identifies i) during a first time period, a first set of digital components that are proposed by one or more third party systems for presentation when one or more of the electronic documents from the set of electronic documents are presented at the client device and ii) during a second time period that occurs after the first time period, a second digital component that is proposed by an additional third party system for presentation when the one or more of the electronic documents are presented at the client device; and a digital component priority queue manager that i) generates, using priority indicators assigned to each first digital component in the set of digital components, a digital component priority queue that specifies an order of presentation of the first digital components from the set of digital components that were identified during the first time period and ii) updates the digital component priority queue at the client device to include the second digital component based on the priority indicator assigned to the second digital component.

Other embodiments of these aspects include corresponding methods and computer programs, configured to perform the actions of the methods, encoded on computer storage devices.

These and other embodiments may each optionally include one or more of the following features. For instance, the digital component priority queue manager further updates the digital component priority queue at the client device based on the priority indicator assigned to the second digital component and the priority indicators assigned to each of the first digital components. The digital component priority queue manager further includes inserting the second digital component into the first digital component priority queue based on the priority indicator assigned to the second digital component rather than a time when the second digital component is added to the digital component priority queue. The priority indicator of each first digital component is assigned by the respective third party system, and the priority indicator of the second digital component is assigned by the additional third party system. The digital component identification device identifies i) during a third time period that occurs after the second time period, a third digital component that, during the third time period, has been proposed by a further third party system for presentation when the one or more of the electronic documents are presented at the client device, and wherein the digital component priority queue manager updates the digital component priority queue at the client device by causing the third digital component to be inserted into the digital component priority queue based on the priority indicator assigned to the third digital component. The digital component priority queue manager further updates the digital component priority queue at the client device based on the priority indicator assigned to the third digital component, the priority indicator assigned to the second digital component, and the priority indicators assigned to each of the first digital components.

Innovative aspects of the subject matter described in this specification may be embodied in methods that include the actions of identifying, by one or more servers, a set of electronic documents for delivery to a client device; during a first time period, identifying, by the one or more servers, a set of first digital components that, during the first time period, have been proposed by one or more third party systems for presentation when one or more of the electronic documents from the set of electronic documents are presented at the client device; generating, by the one or more servers and using priority indicators assigned to each first digital component in the set of first digital components, a digital component priority queue that specifies an order of presentation of the first digital components from the set of first digital components that were identified during the first time period; transmitting, by the one or more servers and to the client device, the set of electronic documents, the set of first digital components, and the digital component priority queue; during a second time period that occurs after the first time period, identifying, by the one or more servers, a second digital component that, during the second time period, has been proposed by an additional third party system for presentation when the one or more of the electronic documents are presented at the client device; and updating, by the one or more servers, the digital component priority queue at the client device, including causing the second digital component to be inserted into the digital component priority queue based on a priority indicator assigned to the second digital component.

Other embodiments of these aspects include corresponding systems, apparatus, and computer programs, configured to perform the actions of the methods, encoded on computer storage devices.

These and other embodiments may each optionally include one or more of the following features. For instance, updating further includes updating, by the one or more servers, the digital component priority queue at the client device based on the priority indicator assigned to the second digital component and the priority indicators assigned to each of the first digital components. Updating the digital component priority queue includes causing the second digital component to be inserted into the first digital component priority queue based on the priority indicator assigned to the second digital component rather than a time when the second digital component is added to the digital component priority queue. The priority indicator of each first digital component is assigned by the respective third party system, and the priority indicator of the second digital component is assigned by the additional third party system. Generating, by the one or more servers, a composite document that i) is hosted by a different domain than at least some electronic documents in the set of electronic documents and ii) includes the set of electronic documents, wherein transmitting further includes transmitting, by the one or more servers and to the client device, the composite page, the set of first digital components, and the digital component priority queue.

Further features include, for instance, during a third time period that occurs after the second time period, identifying by the one or more servers, a third digital component that, during the third time period, has been proposed by a further third party system for presentation when the one or more of the electronic documents are presented at the client device; and updating, by the one or more servers, the digital component priority queue at the client device, including causing the third digital component to be inserted into the digital component priority queue based on the priority indicator assigned to the third digital component. Updating further includes updating, by the one or more servers, the digital component priority queue at the client device based on the priority indicator assigned to the third digital component, the priority indicator assigned to the second digital component, and the priority indicators assigned to each of the first digital components. Receiving, by the one or more servers and from the client device, a search query, wherein identifying further includes identifying, by the one or more servers, the set of electronic documents using the search query.

Particular implementations of the subject matter described in this specification can be implemented so as to realize one or more of the following advantages. High latency digital components (e.g., digital components that are not provided to a client device within a specified latency constraint) are still able to be provided for use by a client device despite the fact that the high latency digital components are not identified and/or provided within the specified latency constraint. Implementations of the present disclosure provide adding digital components (e.g., videos, images, text) to a digital component queue based on a priority of the digital components, and independent of the time that the digital components are added to the digital component queue. That is, higher-latency digital components can be included in the digital component queue despite the fact that those higher-latency digital components did not satisfy the specified latency constraint. For example, a third party system can be experiencing latency-related issues (e.g., network connectivity issues, limited bandwidth, digital component file size, etc.), which may prevent the third party system from responding to a request for digital components within a specified latency constraint. The third-party latency-related issues and/or an amount of bandwidth available to deliver digital components to the client device may prevent larger digital components (e.g., audio, video, or other multimedia files) from being delivered to the client device, and/or added to a digital component queue maintained at the client device, within the latency constraint. To compensate for latency-related issues of third party systems and/or bandwidth constraints that prevent delivery of larger digital components, the digital component queue maintained at the client device is ordered by priority indicators assigned to the digital components, rather than being ordered by time of arrival. Thus, by doing so, this enables the client device to receive lower latency digital components for use within the specified latency constraint and create a queue using those lower latency digital components, while also enabling higher-latency digital components (e.g., video digital components) to be added to the digital component queue at a later time (e.g., after the specified latency constraint has expired), thereby compensating for latency issues (e.g., limited bandwidth) of the third party systems that provide the higher-latency digital components and/or bandwidth constraints that may delay delivery of larger digital components. Further, the priority indicator based management of the digital component queue enables those higher-latency digital components to take the place that they would have occupied in the digital component queue had they also been provided within the specified latency constraint, rather than being added to the digital component queue based solely on their time of deliver to the client device. As such, the techniques discussed in this document improve the functioning of the computer by enabling the computer to provide digital components that it otherwise would not have been able to provide due to specified latency constraint, while still honoring the specified latency constraint by making digital components available to the client device within the specified latency constraint.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 1A, 1B, and 1C illustrate an environment for distribution of digital components.

DETAILED DESCRIPTION

Figure 1A:
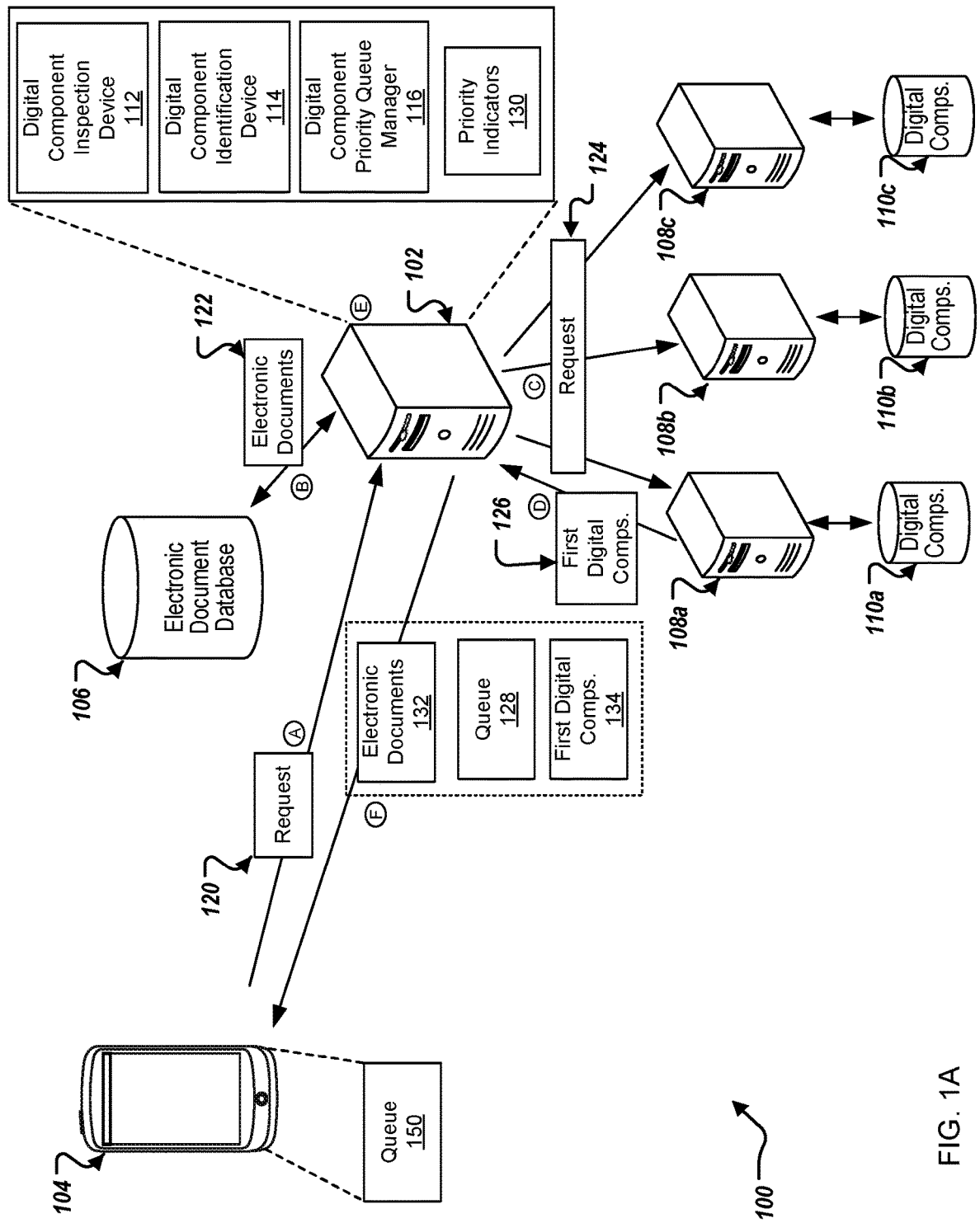

This document describes methods, systems, and computer readable medium that enable high-latency digital components to be distributed in a low-latency environment. For purposes of illustration, assume that a given system distributes digital components in a distributed network environment. The given system may be required to distribute (e.g., transmit) a set of digital components within a specified amount of time (e.g., within a specified latency constraint, which specifies how long the given system has to select and distribute digital components) following receipt of a request for digital components. If the given system fails to distribute digital components within the specified amount of time, the digital components will not be available for presentation with an electronic document that is presented at a client device that requested the digital components. As such, the electronic document may be presented with one or more blank spaces where digital components would have otherwise been presented. Also, the unavailability of digital components can potentially lead to page load errors (or other errors) at the client device.

The given system may fail to distribute digital components within the specified amount of time for various different reasons. For example, the given system may simply fail to respond to the request for digital components within the specified amount of time. For purposes of illustration, assume that the given system contacts third-party systems to identify the digital components that will be provided in response to the request. These third-party systems may be allotted a certain amount of time (e.g., an amount of time less than the specified amount of time within which the given system must respond to the digital component request) to respond to the given system. However, if these third-party systems do not respond quickly enough, the given system may not have identified any digital components to provide to the client device in response to the request for digital components. In this situation, the given system will fail to provide digital components to the client device within the specified amount of time following the request for digital components.

In another example, the given system may fail to distribute digital components to the client device within the specified amount of time when the identified digital components are not capable of being transmitted to the client device within the specified amount of time. For example, in situations where the digital components have large file sizes, the available bandwidth for delivering the digital components to the client device may be insufficient to complete delivery of the digital components to the client device within the specified amount of time. For example, if the client device is on a slow mobile network, or there is a large amount of traffic on the network being used by the client device, delivery of the digital components may be delayed beyond the specified amount of time. Similarly, interruptions in communications between the given system and the client device can delay delivery of digital components to the client device within the specified amount of time.

As described throughout this document, techniques can be implemented to enable high latency digital components to be delivered in a low latency environment. As used throughout this specification, the term low latency environment refers to an environment in which a specified latency constraint (e.g., a specified amount of time), or some other constraint, is used to specify an initial amount of time within which digital components should be provided to a client device in response to a request. Meanwhile, the term high latency digital component refers to any digital component that is not provided within the specified amount of time. For example, the low latency digital components may be digital components requiring a low bit rate to transmit to the client device relative to the high latency digital component. For example, the low latency digital components may comprise a small number of bits relative to the high latency digital component.

Generally, the techniques described throughout this document allow for low latency digital components to be provided within the specified amount of time, while still allowing for high latency digital components to be provided after the specified amount of time is ended. When the low latency digital components are provided to the client device, the client device will be provided with a digital component queue that specifies an order in which the low latency digital components are to be presented at the client device. When the high latency digital components are provided to the client device, the client device will update the digital component queue using priority indicators to place the high latency digital components within the queue based on their priority, rather than their time of arrival at the client device. Thus, the high latency digital components are still provided their same priority within the digital component queue despite the fact that those high latency digital components arrived at the client device after the specified amount of time had ended. These techniques combine the advantages of utilizing a latency constraint, which ensures that digital components are available for presentation at the client device when needed, with the advantages of providing a longer amount of time to identify the digital components that are provided to the client device, which expands the corpus of digital components that are capable of being presented at the client device in response to a digital component request. The techniques may, for example, allow a user interface to be provided using a network and displayed at a client device within a predetermined time period and subsequently populated with components that require additional time to be transmitted to the client device using the network. The techniques may allow a first user interface to be provided that is subsequently enhanced with digital components that are slower to transmit to the device.

As described in more detail below, systems described herein identify a set of electronic documents for delivery to a client device. For example, a system identifies, during a first time period, a set of first digital components that, during the first time period, have been proposed by one or more third party systems for presentation when one or more of the electronic documents from the set of electronic documents are presented at the client device. The system generates, using priority indicators assigned to each first digital component in the set of first digital components, a digital component priority queue that specifies an order of presentation of the first digital components from the set of first digital components that were identified during the first time period. The system transmits, to the client device, the set of electronic documents, the set of first digital components, and the digital component priority queue. The system identifies, during a second time period that occurs after the first time period, a second digital component that, during the second time period, has been proposed by an additional third party system for presentation when the one or more of the electronic documents are presented at the client device. The system updates the digital component priority queue at the client device, including causing the second digital component to be inserted into the digital component priority queue based on a priority indicator assigned to the second digital component.

Figure 1C:
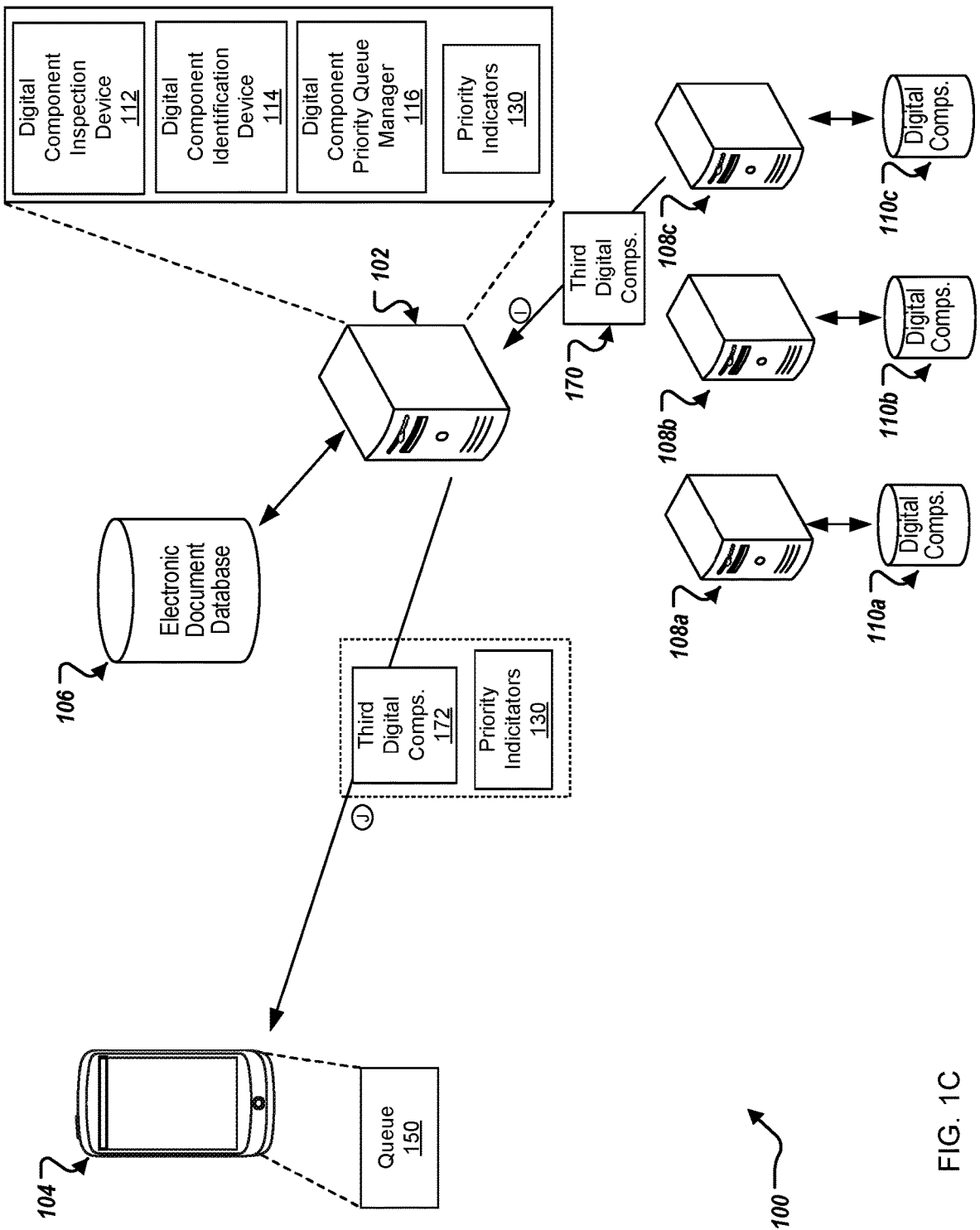

FIGS. 1A-1C illustrate an environment 100 for distribution of digital components. The environment 100 includes a server computing system 102, a client computing device 104, an electronic document database 106, third party computing systems 108a, 108b, 108c (collectively referred to as third party computing systems 108), and digital component repositories 110a, 110b, 110c (collectively referred to as digital component repositories 110). The server computing system 102 includes an electronic document inspection device 112, a digital component identification device 114, and a digital component priority queue manager 116. Each of the electronic document inspection device 112, the digital component identification device 114, and the digital component priority queue manager 116 can be a separate server computing system, or a combination of server computing systems.

The server computing system 102 is in communication with the client computing device 104, the electronic document database 106, and the third party computing system 108 over one or more networks. Each of the third party computing systems 108a, 108b, 108c may be in communication with a respective digital component repository 110a, 110b, 110c, which each store digital components that are distributed by the respective third party computing systems. The digital components can include text, image, video, or multimedia digital content. In some examples, the digital components can include advertisements.

Referring to FIG. 1A, in some implementations, the server computing system 102 receives from the client computing device 104, a request 120 for electronic documents (operation A). In some examples, the request can include a search query. The request 120 can include a textual query, a visual query, an audio query, or a combination thereof.

The server computing system 102, and in particular, the electronic inspection device 112, identifies a set of electronic documents 122 (operation B), e.g., in response to the request 120. In some examples, when the request 120 includes a search query, the electronic inspection device 112 identifies the electronic documents 122 using the search query—that is, electronic documents 122 that are responsive to the search query. The electronic inspection device 112 can identify the electronic documents 122 responsive to the request 120 based on one or more factors, including keywords, meta-information, and other information that is indicative of the content included in the electronic documents 122. In some implementations, the electronic documents 122 may be news articles from various different news websites.

The server computing system 102 generates a request 124 for digital components for presentation with the electronic documents 122, e.g., when the electronic documents 122 are presented at the client computing device 104. The server computing system 102 transmits the request 124 to any subset of the third party computing systems 108 (operation C), including to each of the third party computing systems 108. In some examples, the server computing system 102 transmits the request to the third party computing system 108 at substantially a same time (e.g., in parallel). In some examples, the request 124 can include information about the electronic documents 122, e.g., identification of the content of the electronic document 122 or a source (e.g., website URL) of the electronic document. In some examples, the request 124 can include information of the client computing device 104, e.g., identification of profile characteristics of the client computing device 104 and/or a user of the client computing device 104.

The server computing system 102, and in particular, the digital component identification device 114, identifies first digital components 126 (operation D), during a first time period (e.g., within a specified amount of time or latency constraint). Specifically, in response to the request 124, the third party computing system 108a accesses the digital component repository 110a to identify the first digital components 126 that are being proposed, by the third party computing system 108a, for presentation when one or more of the electronic documents 122 are presented at the client computing device 104. In some examples, the first digital components 126 can be identified by the third party computing system 108a based on content of the electronic documents 122, characteristics of the client computing device 104, or both. In some examples, the first digital components 126 can be determined to be responsive to a search query of the request 120 based on the search query itself and/or one or more criteria of the electronic documents 122, including keywords, meta-information, and other information that are indicative of the content of the electronic documents 122. In some examples, the first digital components 126 include text, image, and/or video. The third party computing system 108a transmits the first digital components 126 to the server computing system 102, e.g., in response to the request 124, during the first time period.

The first digital components 126 can be presented in combination with presentation of the electronic documents 122 by the client computing device 104, described further herein. In some examples, the first digital components 126 can be presented within one or more of the electronic documents 122 when the electronic documents 122 are presented by the client computing device 104.

The server computing system 102, and in particular, the digital component priority queue manager 116, generates a digital component priority queue 128 (operation E). The digital component priority queue 128 can be provided to the client computing device 104 when the first digital components 134 are provided to the client computing device 104. The digital component priority queue 128 specifies an order of presentation of the first digital components 126 that were identified during the first time period. The order of presentation of the first digital components 126 is an order that the client computing device 104 presents the first digital components 126 within the electronic documents 122, described further herein. For example, digital component residing at the top of the digital component priority queue 128 is selected for presentation with the electronic documents 122 prior to digital component residing below the top of the digital component priority queue 128.

The digital component priority queue manager 116 generates the digital component priority queue 128 using priority indicators 130. The priority indicators 130 are respectively assigned to each first digital component 126. In some examples, the digital component priority queue manager 116 assigns the priority indicators 130 to each of the first digital components 126 based on a resource allocation of the respective first digital components 126. In some examples, the third party computing system 108a assigns the priority indicators 130 to each of the first digital components 126.

In some examples, the priority indicators 130 of the first digital components 126 are based on bids provided by the third party computing system 108a, e.g., in response to a real-time auction of presentation of digital components within the electronic documents 122. Thus, a priority indicator 130 can indicate a bid of the respective first digital component 126 or a value computed using the bid (e.g., bid predicted performance).

The digital component priority queue manager 116 positions the first digital components 126 within the digital component priority queue 128 based on the priority indicators 130. For example, digital components having a higher priority, as indicated by the priority indicators 130, are positioned higher within the digital component priority queue 128 as compared to digital components having a lower priority, as indicated by the priority indicators 130.

Figure 2:
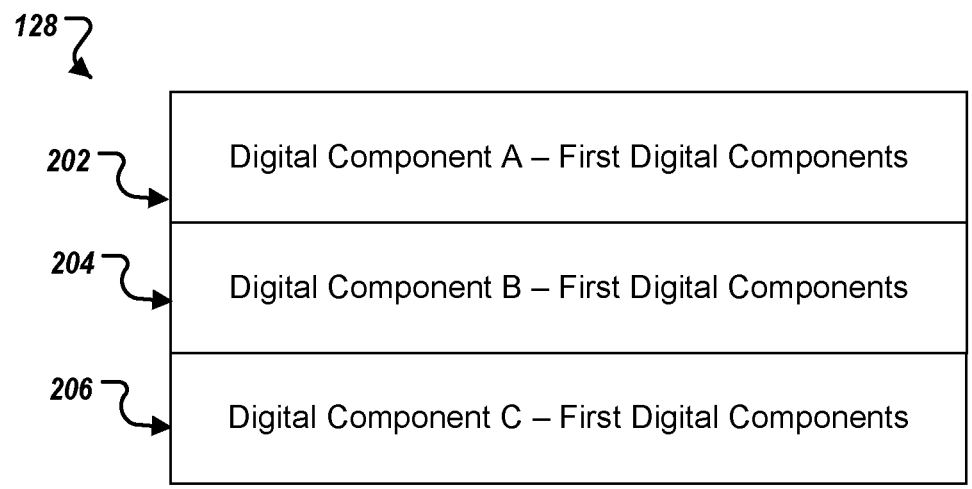
FIGS. 2, 3, 4, and 5 illustrate an example digital component priorityqueue.

FIG. 2 is an illustration of an example digital component priority queue 128. The digital component priority queue 128 specifies an order of presentation of the first digital components 126. In the illustrated example, the first digital components 126 include a digital component A, a digital component B, and a digital component C; however, the first digital components 126 can include any number of digital components.

In the illustrated example, the digital component priority queue manager 116 positions, based on the priority indicators 130 of each of the first digital components 126, the digital component A within a first position 202, the digital competent B within a second position 204, and the digital component C within a third position 206. That is, the priority indicator 130 of the digital component A is greater than the priority indicator 130 of the digital component B; and the priority indicator 130 of the digital component B is greater than the priority indicator 130 of the digital component C.

Referring back to FIG. 1A, the server computing system 102 transmits, to the client computing device 104, a subset 132 of the electronic documents 122, a subset 134 of the first digital components 126, and the digital component priority queue 128 (operation F). The subset 132 of the electronic documents 122 can be any portion, or each of, the electronic documents 122. Note that the electronic documents 122 may be provided by another computing system (e.g., operated by another entity). The subset 132 of the first digital components 122 can be any portion, or each of, the first digital components 126. The subset 132 of the first digital components 126 are transmitted to the client computing device 104 during the first time period.

In some implementations, the server computing system 102 ensures that the subset 132 of the first digital components 126 are transmitted to the client computing device 104 within the first time period using a counter or other timing mechanism. For example, upon receiving the request 120, the server computing system 102 can start a timer. The timer can be either a count up timer or a countdown timer, and the server computing system 102 can be configured to transmit the subset 132 of the first digital components 126 when the timer reaches a specified value (e.g., a time corresponding to the end of the first period when the count up timer is used or zero when the countdown timer is used).

In some examples, the client computing device 104 can store the subset 132 of the electronic documents 122, the subset 134 of the first digital components 126, and the digital component priority queue 128, shown as digital component priority queue 150. That is, the client computing device 104 stores a local copy of the digital component priority queue 128 as digital component priority queue 150.

Referring to FIG. 1 B, the server computing system 102, and in particular, the digital component identification device 114, identifies second digital components 152 (operation G), during a second time period that occurs after the first time period (e.g., after the specified amount of time or latency constraint has lapsed). Specifically, in response to the request 124, the third party computing system 108b accesses the digital component repository 11Ob to identify the second digital components 152 that are being proposed, by the third party computing system 108b, for presentation when one or more of the electronic documents are presented at the client computing device 104. In some examples, the second digital components 152 can be identified by the third party computing system 108b based on content of the electronic documents 122, characteristics of the client computing device 104, or both. In some examples, the second digital components 152 can be determined to be responsive to a search query of the request 120 based on the search query itself and/or one or more criteria of the electronic documents 122, including keywords, meta-information, and other information that are indicative of the content of the electronic documents 122. In some examples, the second digital components 152 include text, image, and/or video. The third party computing system 108b transmits the second digital components 152 to the server computing system 102, e.g., in response to the request 124, during the second time period that occurs after the first time period.

The second digital components 152 can be presented in combination with presentation of the electronic documents 122 by the client computing device 104, described further herein. In some examples, the second digital components 152 can be presented within one or more of the electronic documents 122 when the electronic documents 122 are presented by the client computing device 104.

The server computing system 102, and in particular, the digital component priority queue manager 116 updates the digital component priority queue 150 at the client computing device 104 (operation H). Specifically, the digital component priority queue manager 116 updates the digital component priority queue 150 to cause one or more of the second digital components 152 to be inserted into the digital component priority queue 150 based on the priority indicators 130 assigned to the second digital components 152.

The priority indicators 130 are assigned to each of the second digital components 152. In some examples, the digital component priority queue manager 116 assigns the priority indicators 130 to each of the second digital components 152 based on respective resource allocation of the second digital components 152. In some examples, the third party computing system 108b assigns the priority indicators 130 to each of the second digital components 152.

In some examples, the priority indicators 130 of the second digital components 152 are based on bids provided by the third party computing system 108b, e.g., in response to a real-time auction of presentation of digital components within the electronic documents 122. Thus, a priority indicator 130 can indicate a bid of the respective second digital component 152 (e.g., bid predicted performance).

The digital component priority queue manager 116 updates the digital component priority queue 150 at the client computing device 104 by transmitting, to the client computing device 104, a subset 154 of the second digital components 152 and priority indicators 130 of the subset 154 of the second digital components 152. Specifically, by transmitting the priority indicators 130 of the subset 154 of the second digital components 152, the digital component priority queue manager 116 causes the second digital components 152 to be inserted into the digital component priority queue 150 based on the priority indicators 130 assigned to the second digital components 152. The subset 154 of the second digital components 152 can be any portion, or each of, the second digital components 152. The subset 154 of the second digital components 152 are transmitted to the client computing device 104 during the second time period.

In some implementations, the server computing system 102 ensures that the subset 154 of the second digital components 152 are transmitted to the client computing device 104 within the second time period using a counter or other timing mechanism. For example, upon receiving the request 120, the server computing system 102 can start a timer. The timer can be either a count up timer or a countdown timer, and the server computing system 102 can be configured to transmit the subset 154 of the second digital components 152 when the timer reaches a specified value (e.g., a time corresponding to the end of the second period when the count up timer is used or zero when the countdown timer is used).

For example, the client computing device 104 adjusts the digital component priority queue 150 based on the priority indicators 130 of the subset 154 of the second digital components 152, and further based on the priority indicators 130 of the subset 134 of the first digital components 126.

Figure 3:
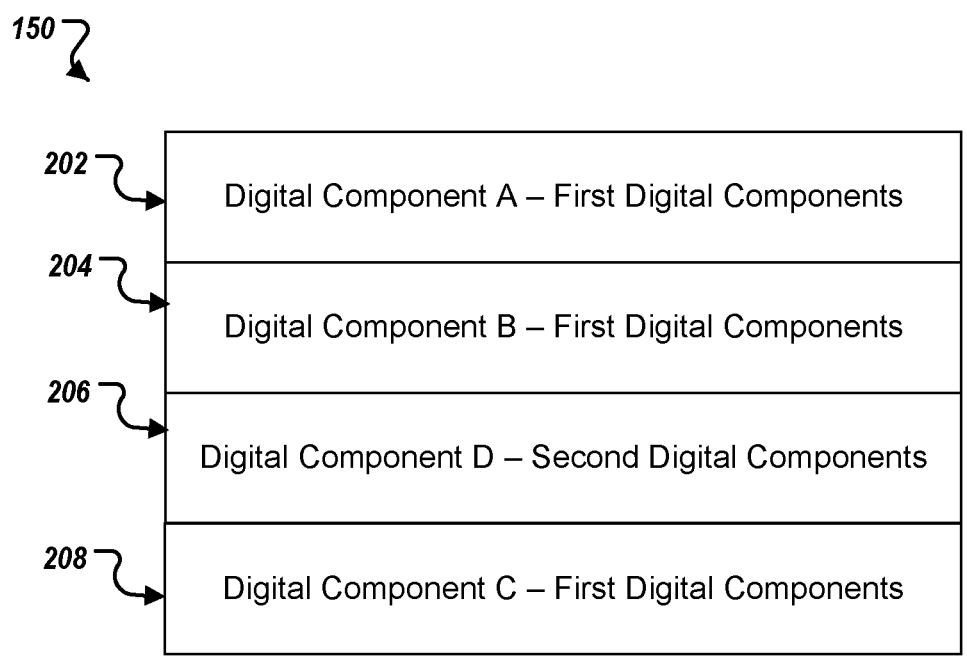

FIG. 3 is an illustration of an example digital component priority queue 150 after updating to specify an order of presentation of the first digital components 126 and the second digital components 152. Specifically, as illustrated in FIG. 3, the digital component priority queue 150 is updated to include a digital component D of the second digital components 152 that is positioned in the third position 206, with the digital component C re-positioned to a fourth position 208. That is, the priority indicator 130 of the digital component D is greater than the priority indicator 130 of the digital component C; and further, the priority indicator 130 of the digital component B is greater than the priority indicator 130 of the digital component D.

In some examples, the digital component priority queue manager 116 updates the digital component priority queue 150 at the client computing device 104 based on the priorities indicators 130 of the second digital components 152 rather than a time when the second digital components 152 are added to the digital component priority queue 150. For example, the second digital components 152 are identified and added to the digital component priority queue 150 at a second time that is later than a first time when the first digital components 126 are identified and the digital component priority queue 128 was generated. Thus, the positioning of the first digital components 126 and the second digital components 152 within the digital component priority queue 150 is based on the priority indicators 130 of the first digital components 126 and the second digital components 152, and not based on the time that the first digital components 126 and the second digital components 152 were identified and/or added to the digital component priority queue 150.

As a result, later arriving digital components—thesecond digital components 152—are able to be added to the digital priority component queue 150 without subjection to penalizations based on time (e.g., moved to a lower position in the digital priority component queue 150 based on the time of receipt).

Figure 4:
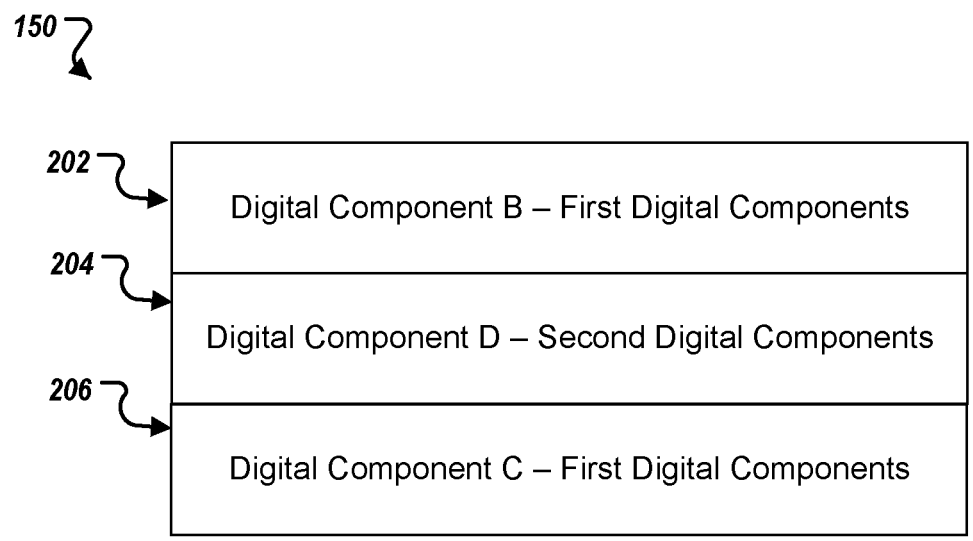

FIG. 4 is an illustration of an example digital component priority queue 150 after the digital component A is removed from the digital component priority queue 150. For example, the digital component A was presented (e.g., with one of the electronic documents 122) by the client computing device 104. As a result, the digital component B is re-positioned to the first position 202, the digital component D is re-positioned to the second position 204, and the digital component C is re-positioned to the third position 206.

Referring to FIG. 1C, the server computing system 102, and in particular, the digital component identification device 114, identifies third digital components 170 (operation I), during a third time period that occurs after the second time period. Specifically, in response to the request 124, the third party computing system 108c accesses the digital component repository 110c to identify the third digital components 170 that are being proposed, by the third party computing system 108c, for presentation when one or more of the electronic documents are presented at the client computing device 104. In some examples, the third digital components 170 can be identified by the third party computing system 108a based on content of the electronic documents 122, characteristics of the client computing device 104, or both. In some examples, the third digital components 170 can be determined to be responsive to a search query of the request 120 based on the search query itself and/or one or more criteria of the electronic documents 122, including keywords, meta-information, and other information that are indicative of the content of the electronic documents 122. In some examples, the third digital components 170 include text, image, and/or video. The third party computing system 108c transmits the third digital components 170 to the server computing system 102, e.g., in response to the request 124, during the third time period that occurs after the second time period.

The third digital components 170 can be presented in combination with presentation of the electronic documents 122 by the client computing device 104, described further herein. In some examples, the third digital components 170 can be presented within one or more of the electronic documents 122 when the electronic documents 122 are presented by the client computing device 104.

The server computing system 102, and in particular, the digital component priority queue manager 116 updates the digital component priority queue 150 at the client computing device 104 (operation J). Specifically, the digital component priority queue manager 116 updates the digital component priority queue 150 to cause one or more of the third digital components 170 to be inserted into the digital component priority queue 150 based on the priority indicators 130 assigned to the third digital components 170.

The priority indicators 130 are assigned to each of the third digital components 170. In some examples, the digital component priority queue manager 116 assigns the priority indicators 130 to each of the third digital components 170 based on respective resource allocations of the third digital components 170. In some examples, the third party computing system 108c assigns the priority indicators 130 to each of the third digital components 170.

In some examples, the priority indicators 130 of the third digital components 126 are based on bids provided by the third party computing system 108c, e.g., in response to a real-time auction of presentation of digital components within the electronic documents 122. Thus, a priority indicator 130 can indicate a bid of the respective third digital component 170 (e.g., bid predicted performance).

The digital component priority queue manager 116 updates the digital component priority queue 150 at the client computing device 104 by transmitting, to the client computing device 104, a subset 172 of the third digital components 170 and priority indicators 130 of the subset 172 of the third digital components 170. Specifically, by transmitting the priority indicators 130 of the subset 172 of the third digital components 170, the digital component priority queue manager 116 causes the third digital components 170 to be inserted into the digital component priority queue 150 based on the priority indicators 130 assigned to the third digital components 170. The subset 172 of the third digital components 170 can be any portion, or each of, the third digital components 170. The subset 172 of the third digital components 170 are transmitted to the client computing device 104 during the third time period.

In some implementations, the server computing system 102 ensures that the third digital components 170 are transmitted to the client computing device 104 within the third time period using a counter or other timing mechanism. For example, upon receiving the request 120 the server computing system 102 can start a timer. The timer can be either a count up timer or a countdown timer, and the server computing system 102 can be configured to transmit the subset 172 of the third digital components 170 when the timer reaches a specified value (e.g., a time corresponding to the end of the first period when the count up timer is used or zero when the countdown timer is used).

For example, the client computing device 104 adjusts the digital component priority queue 150 based on the priority indicators 130 of the subset 172 of the third digital components 170, and further based on the priority indicators 130 of the subset 134 of the first digital components 126 and the subset 154 of the second digital component 152.

Figure 5:
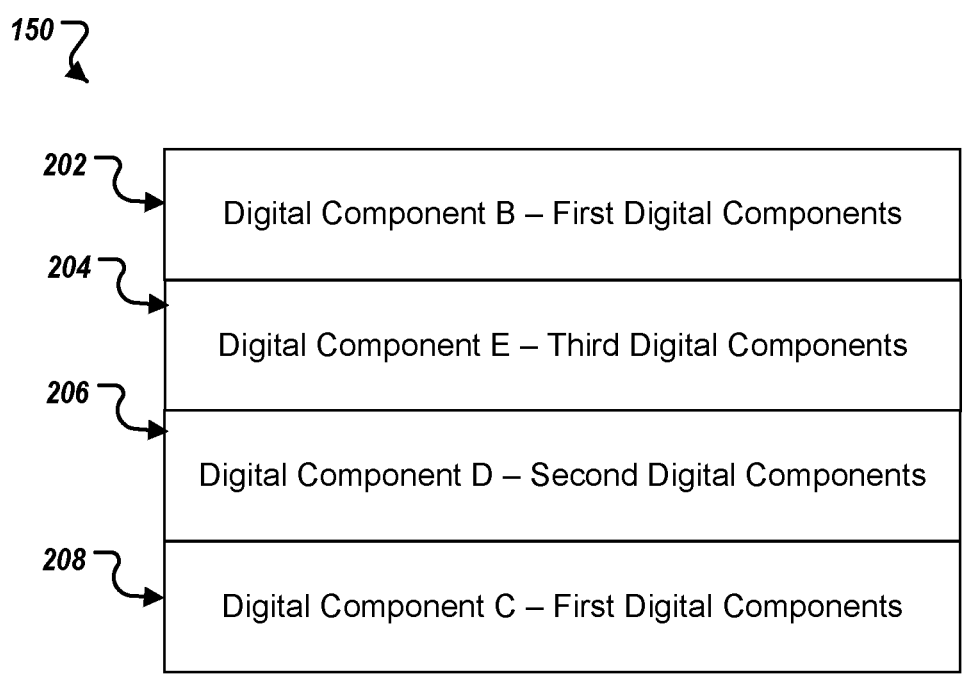

FIG. 5 is an illustration of an example digital component priority queue 150 after updating to specify an order of presentation of the first digital components 126, the second digital components 152, and the third digital components 170. Specifically, as illustrated in FIG. 5, the digital component priority queue 150 is updated to include a digital component E of the third digital components 170 that is positioned in the second position 204, with the digital component D re-positioned to the third position 206 and the digital component C re-positioned to the fourth position 208. That is, the priority indicator 130 of the digital component E is greater than the priority indicator 130 of the digital component D; and further, the priority indicator 130 of the digital component B is greater than the priority indicator 130 of the digital component E.

In some examples, the subset 132 of the electronic documents 122 can include a composite electronic document. That is, the server computing system 102 can generate a composite electronic document that is i) hosted at a different domain than at least some of electronic documents 122 of the subset 132 and ii) includes various electronic documents 122 from the subset 132. The composite electronic document can be hosted at a domain (e.g., example.com) that differs from the domains of the subset 132 of the electronic documents 122. Further, the electronic documents 122 included by an initial version of the composite electronic document provides for display a portion (or snippet) of the electronic documents 122 that are identified as responsive to the request 120. For example, the initial version of the composite electronic document can include search results that each include a snippet of the corresponding electronic document 122.

In some examples, the composite electronic document initially hides presentation of at least some of the electronic documents 122, e.g., when the composite electronic document is initially presented at the client computing device 104. However, for each displayed snippet of the electronic document 122 of the composite electronic document, the composite electronic document includes corresponding digital content of the electronic document 122 that is hidden from an initial display of the composite electronic document. That is, the initial version of the composite electronic document i) can display a snippet of the electronic document 122 that is different than the complete electronic document 122 and ii) can include the complete electronic document 122 hidden from the initial version of the composite electronic document.

Figure 6:
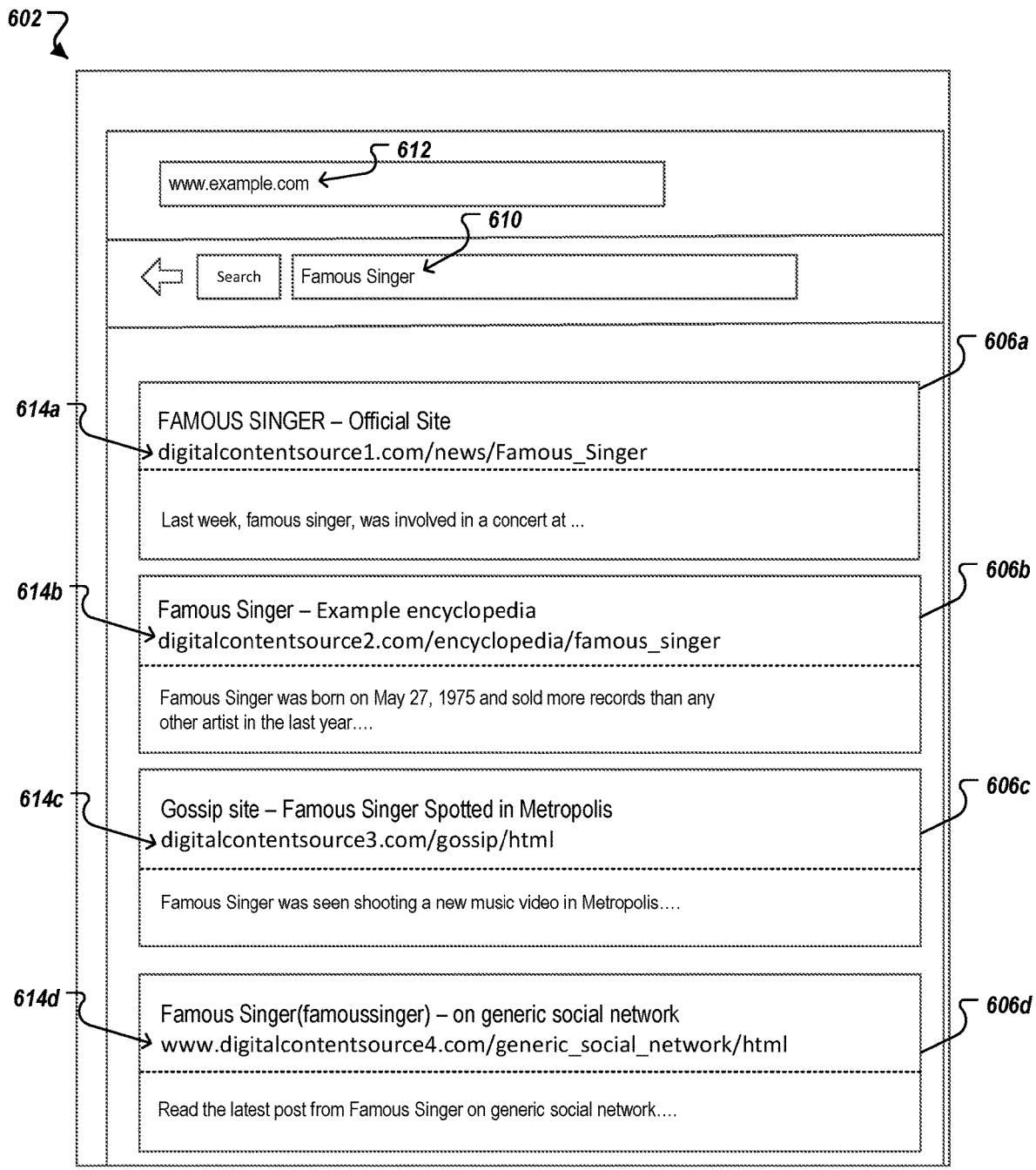
FIGS. 6 and 7 illustrate an example graphical user interface displaying an example composite page including digital components.

FIG. 6 illustrates an example of a composite page 602. The composite page 602 includes user interface components in the form of search results 606 (shown as search results 606a, 606b, 606c, 606d) that are responsive to the request 120. In the illustrated example, the search results 606 are responsive to the request 120 including a search query of "famous singer" and are based on the electronic documents 122. The search results 606 each include a modified version of the corresponding electronic document 122, including a snippet of the corresponding electronic document 122 (e.g., a headline of the electronic document 122, a domain of the electronic document 122, and a first textual portion of the corresponding electronic document 122). Furthermore, in the illustrated example, the composite page 602 is hosted at a domain 612 (e.g., example.com) different than domains 614 (shown as domains 614a, 614b, 614c, 614d) that host the electronic documents 122 (e.g., digitalcontentsource1.com, digitalcontentsource2.com, digitalcontentsource3.com, digitalcontentsource4.com).

In some implementations, the client computing device 104 detects interaction with one of the search results 606. For example, one of the snippets of the electronic documents 122 provided within the composite page 602 is selected, e.g., by a user of the client computing device 104. In response to the selection, the client computing device 104 updates the visualization of the composite page 602 to reveal the electronic document 122 of the selected snippet. Specifically, the composite page 602 is graphically animated (or altered) to transition from the initial version of the composite page 602 that includes the snippets of the electronic documents 122 to an updated version of the composite page 602 that includes the full electronic document 122 of the selected snippet. Note that this updated version of the composite page 602 can be presented without requiring an additional network call or request for the electronic document 122 being revealed by way of the user interaction. Rather, the electronic document 122 that is already included in the composite page 602, which is stored at the client computing device 104, is revealed to the user.

Figure 7:
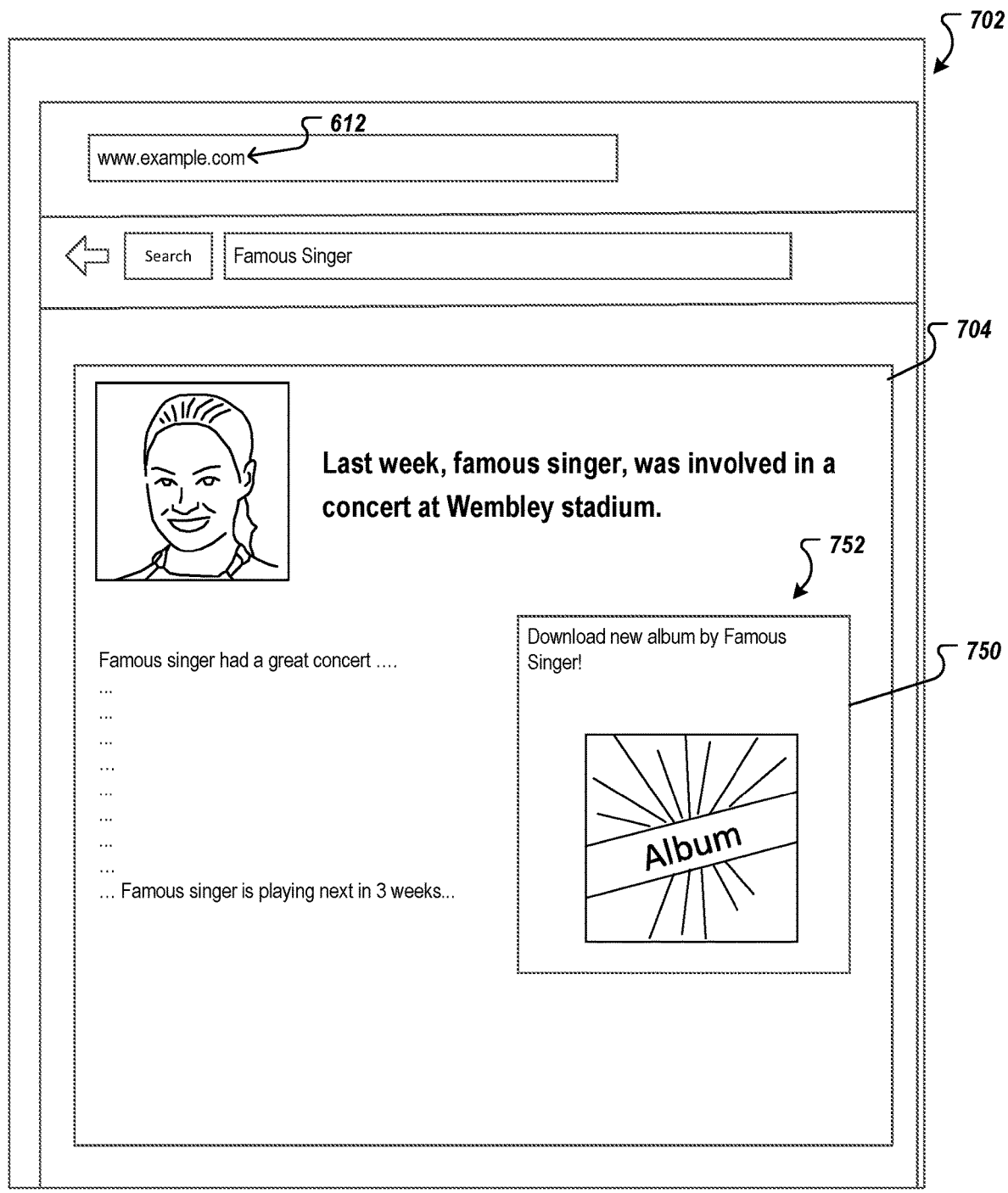

In some examples, the composite page 602 is updated to reveal the electronic document 122 of the selected snippet independent of an additional request for content of the electronic document 122. FIG. 7 illustrates an example composite page 702, similar to the composite page 602 of FIG. 6. Specifically, the composite page 702 is an updated version of the composite page 602 of FIG. 6 that is presented after revealing the full electronic document 122 of selected snippet. For example, the selected snippet corresponds to the search result 606a, as shown in FIG. 6. In response to the selection of the search result 606a, the composite page 602, of FIG. 6, is updated to reveal the full electronic document 122 of the search result 606a, forming the composite page 702. In the illustrated example, the search result 606a corresponds to a news article identified by the search query "famous singer," and in response to the selection of the search result 606a, the full electronic document 122 of the search result 606a is revealed, shown as full digital content 704. Additionally, the composite page 702 is hosted at a domain (e.g., example.com), similar to that of the composite page 602, that is different than the domain of the full digital content 704 (e.g., digitalcontenstsource1.com).

In some implementations, the composite page 602 is also updated to include a digital component 750, as shown by the composite page 702 of FIG. 7. The digital component 750 is one of the first digital components 126, the second digital components 152, and the third digital components 170 based on the order of presentation of the digital component priority queue 150. For example, based on the digital component priority queue 150 of FIG. 5, the digital component B is selected, e.g., by the client computing device 104, for presentation with the composite page 702 and includes the text "Download new album by Famous Singer" and an image of the new album.

Figure 8:
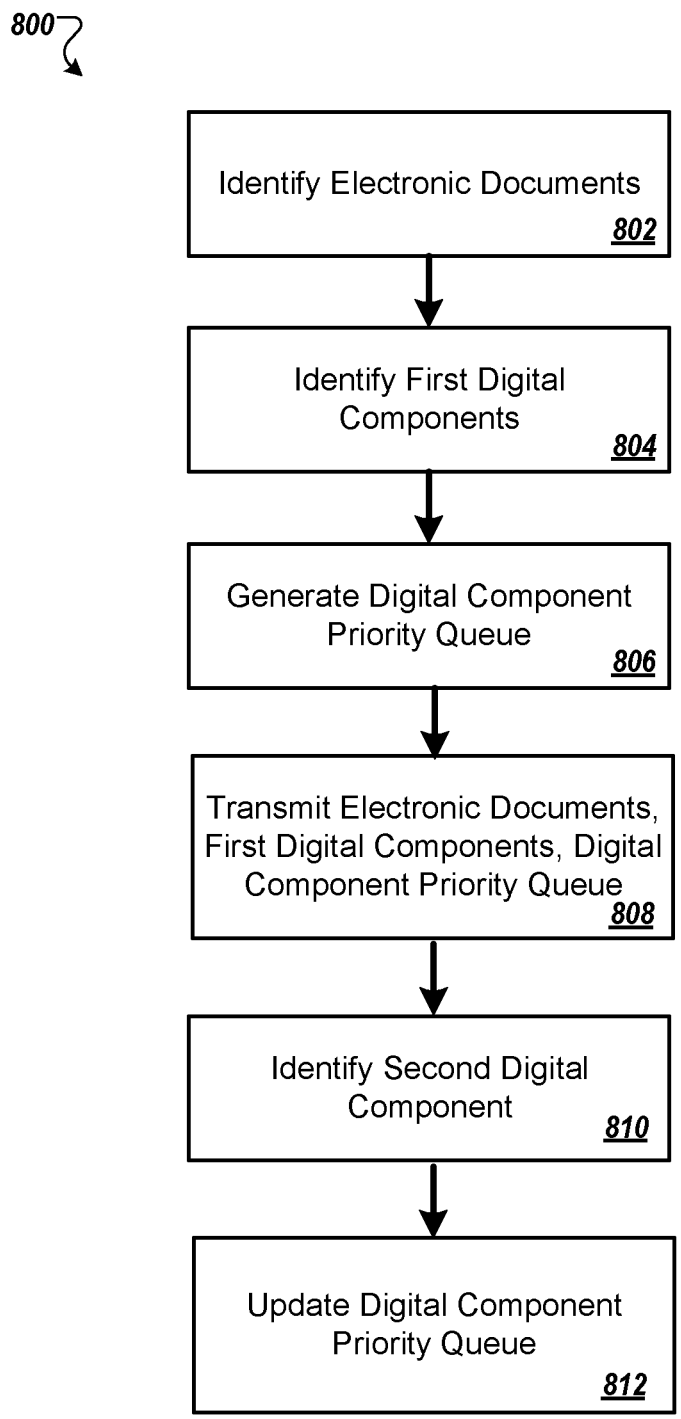
FIG. 8 illustrates an example process for managing a digital component priority queue.

FIG. 8 illustrates an example process 800 for distribution of digital content assets. The process 800 can be performed, for example, by the server computing system 102 and/or the client computing device 104, or another data processing apparatus. The process 800 can also be implemented as instructions stored on computer storage medium, and execution of the instructions by one or more data processing apparatus cause the one or more data processing apparatus to perform some or all of the operations of the process 800.

The digital component inspection device 112 identifies the electronic documents 122 for delivery to the client computing device 104 (802). For example, the server computing system 102, and in particular, the electronic inspection device 112, identifies the electronic documents 122 that are responsive to the request 124 (search query). The digital component identification device 114 identifies, during a first time period, a set of first digital components 126 that, during the first time period, have been proposed by the third party computing system 108a for presentation when one or more of the electronic documents 122 are presented at the client computing device 104 (804). For example, in response to the request 124, the third party computing system 108a accesses the digital component repository 110a to identify the first digital components 126. The third party computing system 108a can identify the first digital components 126 based on content of the electronic documents 122, characteristics of the client computing device 104, or both.

The digital component priority queue manager 116 generates, using priority indicators 130 assigned to each first digital component 126, a digital component priority queue 128 that specifies an order of presentation of the first digital components 126 (806). For example, the digital component priority queue manager 116 compares the priority indicators 130 of the first digital components 126, and determines that a priority indicator 130 of first digital component n1 of the first digital components 126 is greater than the priority indicator 130 of first digital component n2 of the first digital components 126, and positions the first digital component n1 higher than the second digital component n2. The server computing system 102 transmits, to the client computing device 104, the electronic documents 122, the first digital components 126, and the digital component priority queue 128 (808). For example, the server computing system 102 transmits the electronic documents 122, the first digital components 126, and the digital component priority queue 128 during the first time period.

The digital component identification device 114 identifies, during a second time period that occurs after the first time period, a second digital component 152 that, during the second time period, has been proposed by the third party computing system 108b for presentation when the electronic documents 122 are presented at the client computing device 104 (810). For example, in response to the request 124, the third party computing system 108b accesses the digital component repository 110b to identify the second digital components 152. The third party computing system 108b can identify the second digital components 152 based on content of the electronic documents 122, characteristics of the client computing device 104, or both. The digital component priority queue manager 116 updates the digital component priority queue 150 at the client computing device 104, including causing the second digital component 152 to be inserted into the digital component priority queue 130 based on a priority indicator 130 assigned to the second digital component 152 (812). For example, the client computing device 104 compares the priority indicators 130 of the first digital components 126 and the second digital components 152, and determines that a priority indicator 130 of third digital component n3 of the second digital components 126 is greater than the priority indicators 130 of first digital component n1 and n2 of the first digital components 126, and positions the third digital component n3 higher than the first digital components n1 and n2.

Figure 9:
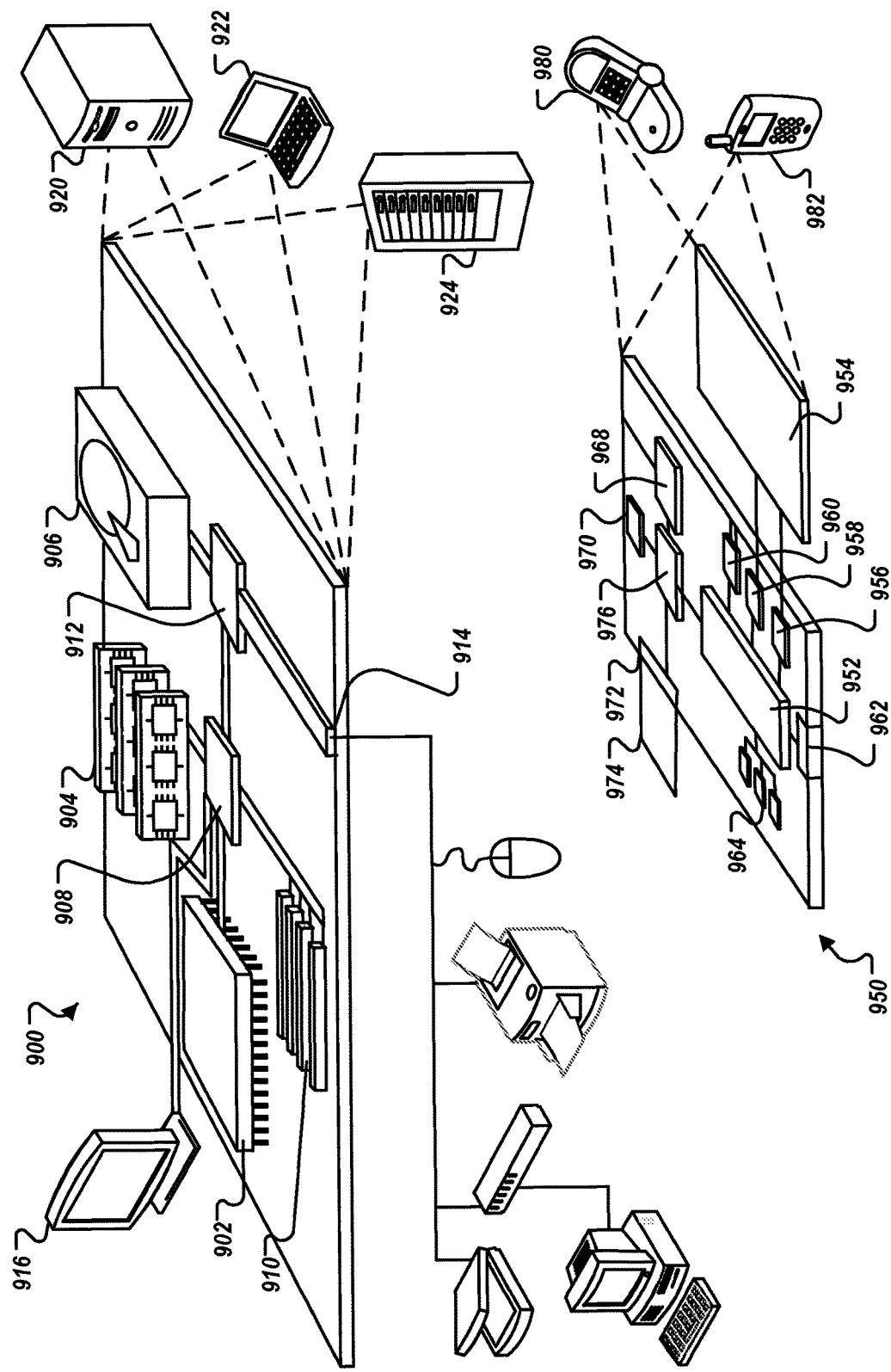
FIG. 9 illustrates an example computing system and mobile computing device that may be used to implement the techniques described herein.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 may process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 904, the storage device 906, or a memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 may execute instructions within the computing device 640, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 648 and display interface 956 coupled to a display 954. The display 954 may be, for example, a TFT LCD (Thin-Film-Transistor Liquid Crystal Display) or an OLEO (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 may be implemented as one or more of a computer-readable medium or media, a volatile memory unit or units, or a non-volatile memory unit or units. Expansion memory 954 may also be provided and connected to device 950 through expansion interface 952, which may include, for example, a SIMM (Single In Line Memory Module) card interface. Such expansion memory 954 may provide extra storage space for device 950, or may also store applications or other information for device 950. Specifically, expansion memory 954 may include instructions to carry out or supplement the processes described above, and may include secure information also. Thus, for example, expansion memory 954 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 954, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TOMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 950 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method comprising:
receiving, by one or more computers, a request for digital components to present with one or more electronic documents at a client device;
providing, by the one or more computers and to the client device, a set of first digital components and a digital component priority queue that indicates an order of presentation of the first digital components, wherein the digital component priority queue is configured to be accessed by the client device at a time of presenting an electronic document of the one or more electronic documents at the client device so as to select, from digital components specified in the digital component priority queue, a digital component to be presented with the electronic document when the electronic document is presented at the client device;
providing, by the one or more computers and to the client device, one or more second digital components that are received at the client device after the first digital components are received at the client device; and
updating, by the one or more computers, the digital component priority queue at the client device to include the one or more second digital components, including causing the client device to insert the one or more second digital components into the digital component priority queue based on a priority indicator assigned to each second digital component.

2. The method of claim 1, further comprising:
selecting the set of first digital components from a first plurality of digital components during a first time period; and
selecting the one or more second digital components from a second plurality of digital components during a second time period after the first time period.

3. The method of claim 1, wherein the one or more second digital components are received at the client device after the set of one or more digital components based on each of the one or more second digital components having a larger file size than each of the first digital components.

4. The method of claim 1, further comprising:
receiving, by the one or more computers, the set of first digital components from one or more first third-party computing systems during a first time period; and
receiving, by the one or more computers, the one or more second digital components from one or more second third-party computing systems during a second time period after the second time period.

5. The method of claim 1, wherein each first digital component comprises an assigned priority indicator and the order of presentation indicated by the digital component priority queue is based on a the priority indicator assigned to each first digital component and the priority indicator assigned to each second digital component.

6. The method of claim 1, wherein updating the digital component priority queue includes causing each second digital component to be inserted into the digital component priority queue based on the priority indicator assigned to the second digital component independent of a time at which the second digital component is added to the digital component priority queue.

7. The method of claim 1, wherein the client device selects, from the digital component queue, a given digital component for presentation with a given electronic document in response to user selection of the given electronic document from a composite page and presents the given digital component with the given electronic document in response to the user selection of the given electronic document.

8. The method of claim 1, wherein the set of first digital components are received at the client device within a specified latency constraint time period and the one or more second digital components are received at the client device after the specified latency constraint time period has expired.

9. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
receiving a request for digital components to present with one or more electronic documents at a client device;
providing, to the client device, a set of first digital components and a digital component priority queue that indicates an order of presentation of the first digital components, wherein the digital component priority queue is configured to be accessed by the client device at a time of presenting an electronic document of the one or more electronic documents at the client device so as to select, from digital components specified in the digital component priority queue, a digital component to be presented with the electronic document when the electronic document is presented at the client device;
providing, to the client device, one or more second digital components that are received at the client device after the first digital components are received at the client device; and
updating the digital component priority queue at the client device to include the one or more second digital components, including causing the client device to insert the one or more second digital components into the digital component priority queue based on a priority indicator assigned to each second digital component.

10. The system of claim 9, wherein the operations comprise:
selecting the set of first digital components from a first plurality of digital components during a first time period; and
selecting the one or more second digital components from a second plurality of digital components during a second time period after the first timer time period.

11. The system of claim 9, wherein the one or more second digital components are received at the client device after the set of one or more digital components based on each of the one or more second digital components having a larger file size than each of the first digital components.

12. The system of claim 9, wherein the operations comprise:
   receiving, by the data processing apparatus, the set of first digital components from one or more first third-party computing systems during a first time period; and
   receiving, by the data processing apparatus, the one or more second digital components from one or more second third-party computing systems during a second time period after the second time period.

13. The system of claim 9, wherein each first digital component comprises an assigned priority indicator and the order of presentation indicated by the digital component priority queue is based on a the priority indicator assigned to each first digital component and the priority indicator assigned to each second digital component.

14. The system of claim 9, wherein updating the digital component priority queue includes causing each second digital component to be inserted into the digital component priority queue based on the priority indicator assigned to the second digital component independent of a time at which the second digital component is added to the digital component priority queue.

15. The system of claim 9, wherein the client device selects, from the digital component queue, a given digital component for presentation with a given electronic document in response to user selection of the given electronic document from a composite page and presents the given digital component with the given electronic document in response to the user selection of the given electronic document.

16. The system of claim 9, wherein the set of first digital components are received at the client device within a specified latency constraint time period and the one or more second digital components are received at the client device after the specified latency constraint time period has expired.

17. A non-transitory computer storage medium encoded with a computer program, the program comprising instructions that when executed by data processing apparatus cause the data processing apparatus to perform operations comprising:
   receiving a request for digital components to present with one or more electronic documents at a client device;
   providing, to the client device, a set of first digital components and a digital component priority queue that indicates an order of presentation of the first digital components, wherein the digital component priority queue is configured to be accessed by the client device at a time of presenting an electronic document of the one or more electronic documents at the client device so as to select, from digital components specified in the digital component priority queue, a digital component to be presented with the electronic document when the electronic document is presented at the client device;
   providing, to the client device, one or more second digital components that are received at the client device after the first digital components are received at the client device; and
   updating the digital component priority queue at the client device to include the one or more second digital components, including causing the client device to insert the one or more second digital components into the digital component priority queue based on a priority indicator assigned to each second digital component.

18. The non-transitory computer storage medium of claim 17, wherein the operations comprise:
   selecting the set of first digital components from a first plurality of digital components during a first time period; and
   selecting the one or more second digital components from a second plurality of digital components during a second time period after the first timer time period.

19. The non-transitory computer storage medium of claim 17, wherein the one or more second digital components are received at the client device after the set of one or more digital components based on each of the one or more second digital components having a larger file size than each of the first digital components.

20. The non-transitory computer storage medium of claim 17, wherein the operations comprise:
   receiving, by the data processing apparatus, the set of first digital components from one or more first third-party computing systems during a first time period; and
   receiving, by the data processing apparatus, the one or more second digital components from one or more second third-party computing systems during a second time period after the second time period.

* * * * *